(12) United States Patent
Cheng

(10) Patent No.: US 7,520,216 B2
(45) Date of Patent: Apr. 21, 2009

(54) METHOD FOR MANUFACTURING LASER HOLOGRAM PAPER

(75) Inventor: Shih-Pin Cheng, Taipei Hsien (TW)

(73) Assignee: Shih-Hung Cheng, Taipei (TW)

( * ) Notice: Subject to any disclaimer, the term of this patent is extended or adjusted under 35 U.S.C. 154(b) by 0 days.

(21) Appl. No.: 11/892,991

(22) Filed: Aug. 29, 2007

(65) Prior Publication Data

US 2007/0298327 A1  Dec. 27, 2007

Related U.S. Application Data

(62) Division of application No. 11/082,656, filed on Mar. 18, 2005.

(51) Int. Cl.
*B31F 1/07* (2006.01)
*B44C 1/24* (2006.01)

(52) U.S. Cl. .................... 101/32; 101/483; 264/1.31; 359/3; 430/1

(58) Field of Classification Search .................... None
See application file for complete search history.

(56) References Cited

U.S. PATENT DOCUMENTS

| 5,492,370 | A * | 2/1996 | Chatwin et al. | 283/110 |
| 6,221,466 | B1 * | 4/2001 | Pasbrig et al. | 428/206 |
| 2002/0018253 | A1 * | 2/2002 | Toshine et al. | 359/3 |
| 2004/0229004 | A1 * | 11/2004 | Spice et al. | 428/64.4 |

FOREIGN PATENT DOCUMENTS

WO    WO 03/002330 A1 *  1/2003

\* cited by examiner

*Primary Examiner*—Jill E. Culler
(74) *Attorney, Agent, or Firm*—Rosenberg, Klein & Lee

(57) ABSTRACT

A method for manufacturing water-based laser hologram papers has acts of entirely or partially coating water-based varnish on a printed paper substrate, subjecting the paper substrate to a mirror treatment, and entirely or partially molding the paper substrate with laser compressing operations. By substituting PVC or PET plastic membranes with decomposable water-based varnish, the laser hologram paper is environmental friendly to reduce pollution and is also breakable to provide counterfeit-deterring efficiency. Moreover, material cost of the plastic membranes is eliminated to reduce manufacturing cost of the laser hologram papers.

10 Claims, 3 Drawing Sheets

METHOD FOR MANUFACTURING LASER HOLOGRAM PAPER

This application is a divisional application of U.S. application Ser. No. 11/082,656, filed Mar. 18, 2005.

BACKGROUND OF THE INVENTION

1. Field of the Invention

The present invention relates to a water-based hologram paper, and more particularly to a water-based hologram paper that is environmentally friendly and highly recyclable and has anti-counterfeiting capability for products, and low contamination and low cost in manufacture.

2. Description of Related Art

Conventional paper substances applied for goods containers or packing material are printed with patterns on an outside periphery to increase appearance attraction to the goods. In order to identify manufacturers or trademarks, laser molding technology is applied to attach laser membranes on the paper substances to achieve laser hologram papers for distinguishability from counterfeits. The conventional laser membranes are usually made of polyvinyl chloride (PVC) and polyethylene glycol terephthalate (PET) plastic membranes that are compressed to combine with the paper substrate. Because of adding the plastic membranes, the manufacturing costs of the laser hologram papers are correspondingly increased. Moreover, laser grains on the plastic membranes are easily misaligned with printed patterns on the paper substrates when the plastic membranes are processed in forming the laser grains in partial sections, locating the patterns at desired positions and even other processes after printing. Therefore, the resulting mismatch of grains and patterns causes the quality of the laser hologram papers to decrease. Additionally, the laser hologram papers are barely recyclable because separating the plastic membrane and the paper substrate is difficult and complex and has high operational cost.

By covering them with the plastic membranes, the laser hologram papers in the form of anti-counterfeiting labels can be completely detached from the goods. Therefore, offenders usually peel the laser hologram papers off and attach them on fake goods to pass them off as genuine ones.

With regard to manufacturing methods for the laser hologram papers, four conventional methods according to different types of laser hologram papers are described as the following:

1. Transparent laser hologram papers entirely with laser grains: the PET plastic membranes are treated with a corona treatment and then a solvent-based resin serving as a bridging agent is coated on surface of the PET plastic membrane after the corona treatment, wherein, the resin is composed of 35±2 wt % acrylate resin, 50±2 wt % isopropanol and 35±2 wt % water. The coated PET plastic membranes are subjected to compression molding and then combined to a paper substrate with printed patterns to achieve the laser hologram papers.

However, the PET plastic membranes on the laser hologram papers can not be recycled and are mostly discarded so that the PET plastic material is wasted and manufacturing cost is high.

2. Transparent laser hologram papers having laser grains in partial sections: the plastic membranes are thermally ironed by means of a gilding operation to attach on partial sections of the paper substrates to complete the patterns.

However, the gilding operation is expensive in operational cost and the patterns are easily mis-aligned so that quality of the laser hologram papers is low.

3. Aluminum-coating laser hologram papers entirely with laser grains: the PET plastic membranes are treated with the corona treatment and the solvent-based resin serving as a bridging agent is coated on the PET plastic membranes. Then, the coated PET plastic membranes are subjected to compression molding to process a working face and are further coated with an aluminum film on the working face by means of vapor deposition. After forming the aluminum film, two faces of the PET plastic membranes are coated again with the solvent-based resin and then combined with a paper substrate to carry out the printing to achieve the laser hologram papers.

In this method, partial laser grains and the patterns are covered by print ink which results in the laser hologram papers having poor quality in appearance.

4. Aluminum-coating laser hologram papers having laser grains in partial sections: the PET plastic membranes are treated with the corona treatment and then the solvent-based resin serving as a bridging agent is coated on the surface of the PET plastic membrane after the corona treatment. The coated PET plastic membranes are subjected to compression molding with a laser nickel board to form the laser grains in partial sections at a working face. Then, the working face is coated with an aluminum film by means of vapor deposition. Lastly, the treated PET plastic membranes are coated with the solvent-based resin at their two sides and then combined with a paper substrate to carry out the printing to achieve the laser hologram papers.

However, laser grains on the plastic membrane and printed patterns on the paper substrate can not be precisely aligned with each other whereby the quality of the laser hologram papers is poor.

The present invention has arisen to mitigate or obviate the disadvantages of the conventional laser hologram papers and the conventional methods for manufacturing the laser hologram papers.

SUMMARY OF THE INVENTION

The main objective of the present invention is to provide a water-based laser hologram paper that is environmentally friendly and highly recyclable and has anti-counterfeiting capability for products and low contamination and low cost in manufacture.

Another main objective of the present invention is to provide methods for manufacturing the laser hologram paper above.

Further benefits and advantages of the present invention will become apparent after a careful reading of the detailed description with appropriate reference to the accompanying drawings.

DETAILED DESCRIPTION OF THE PREFERRED EMBODIMENT

Figure 5:
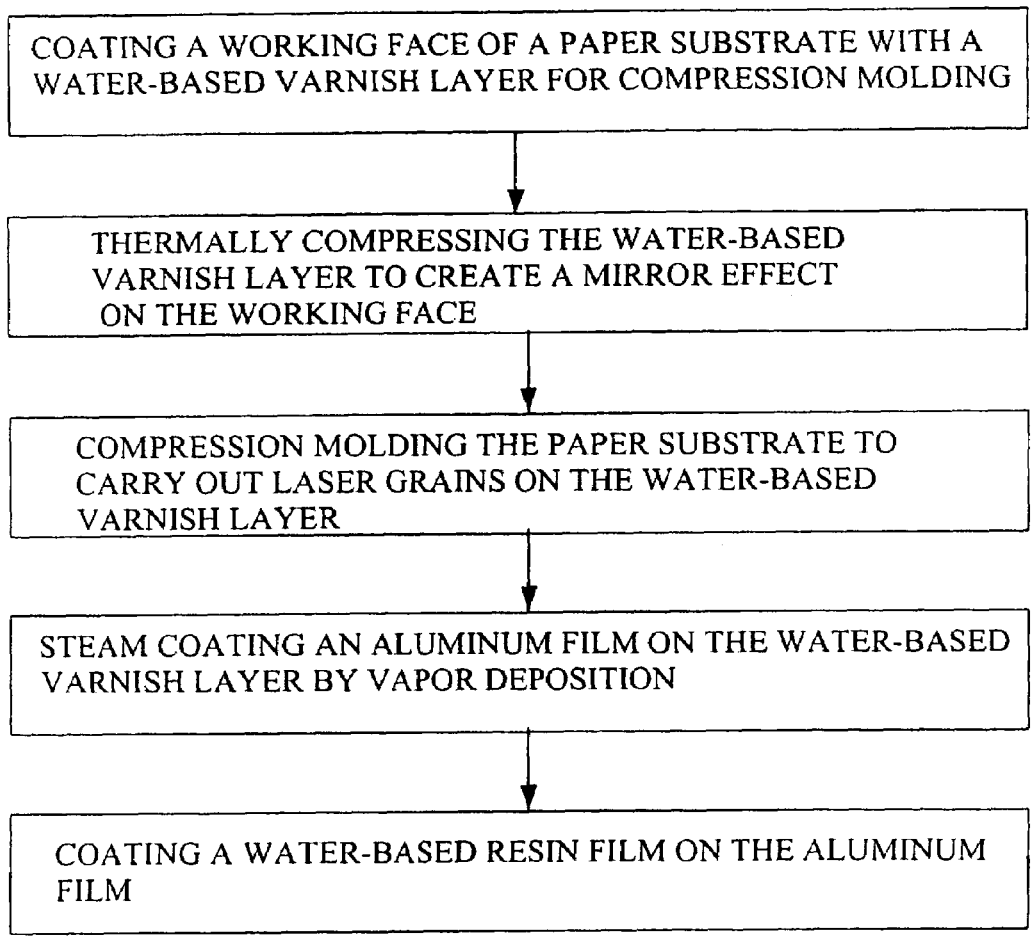
FIG. 5 is a flow chart showing a method for manufacturing a laser hologram paper in accordance with the present invention.

With reference to FIG. 5, a method for manufacturing laser hologram papers in accordance with the present invention substantially comprises acts of:

printing patterns on a working face of a paper substrate (a);

coating the working face with a water-based varnish layer for compression molding (b);

thermally compressing the water-based varnish layer to create a mirror effect (c); and compression molding the paper substrate to form laser grains on the water-based varnish layer (d).

Wherein, the water-based varnish is selected from (a) a thermal-resistant flatting oil composed of 42±2 wt % acrylic copolymer and 55±2 wt % water, (b) a water-based varnish for compression molding composed of 42±2 wt % acrylic copolymer, 3±1 wt % soya bean oil (lecithin)and 55±1 wt % water, and (C) a non-thermoplastic varnish composed of 50-60 wt % acrylic monomer, 40-50 wt % epoxy acrylate oligomer and 5 wt % photo-initiator.

With further reference to FIG. 5, another method for manufacturing the laser hologram papers in accordance with the present invention involves a printing process after the compression molding process and further contains an aluminum coating act. This method comprises acts of:

coating a working face of a paper substrate with a water-based varnish layer for compression molding (a);

thermally compressing the water-based varnish layer to create a mirror effect on the working face (b);

compression molding the paper substrate to perform laser grains on the water-based varnish layer (c);

steam coating an aluminum film on the water-based varnish layer by vapor deposition (d);

coating a water-based resin film on the aluminum film (e); and printing an ink layer on the water-based resin film to form patterns so that an aluminum-coated laser hologram paper is achieved (f).

Wherein, the water-based resin is a bridging agent and is composed of 43±1 wt % acrylic monomer (emulsion of polyacrylate), 45±1 wt % water, and 3±1 wt % ammonium hydroxide.

Figure 1:
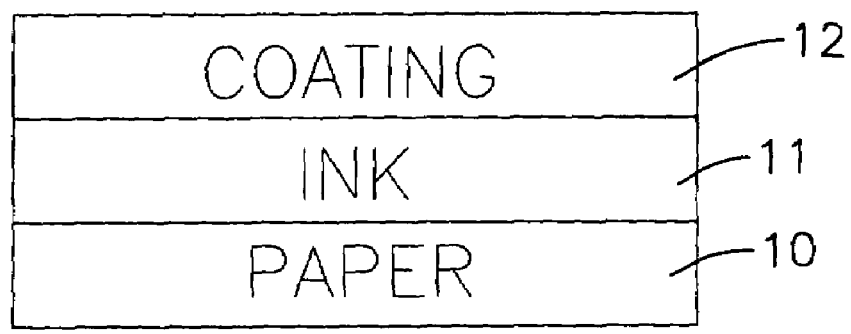
FIG. 1 is a schematic side view of a laser hologram paper in accordance with the present invention.

With reference to FIG. 1, the laser hologram paper comprises a paper substrate (10), an ink layer (11) and a varnish layer (12) sequentially mounted over the paper substrate (10), wherein the varnish layer is made of water-based varnish.

Figure 2:
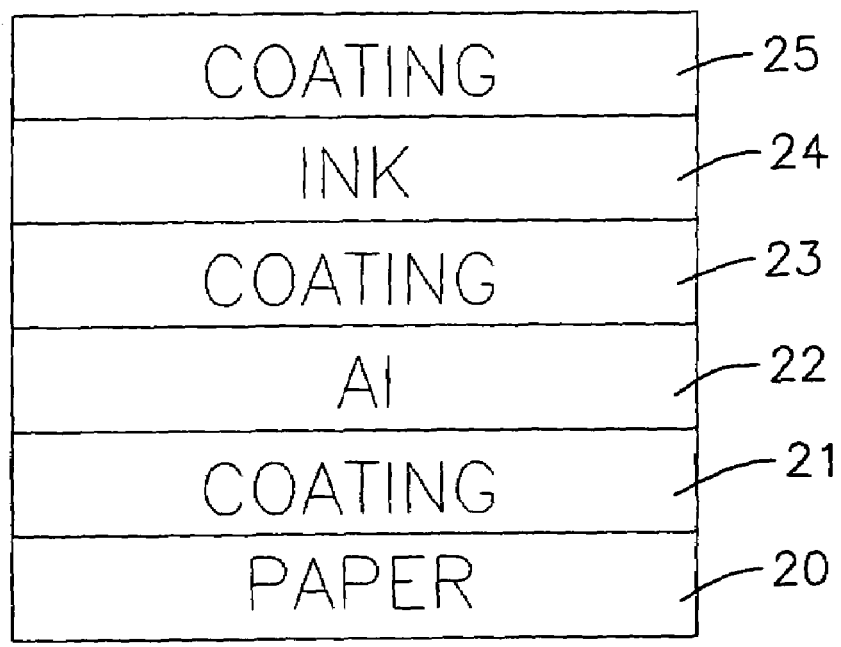
FIG. 2 is a schematic side view of another laser hologram paper in accordance with the present invention.

With reference to FIG. 2, the aluminum-coated laser hologram paper has a paper substrate (20), a first varnish layer (21), an aluminum layer (22), a second varnish layer (23), an ink layer (24) and a third varnish layer (25) sequentially mounted over the paper substrate (10), wherein all varnish layers are made of water-based varnishes.

Preferred embodiments of the methods for manufacturing the water-based laser hologram paper are described as the following.

<Transparent Laser Hologram Paper Entirely with Laser Grains>:

A paper substrate is printed by an ink printing to have desired patterns on a working face. The working face is entirely coated with water-based varnish that is made of a thermal-resistant flatting oil composed of 42±2 wt % acrylic copolymer and 55±2 wt % water or a water-based varnish for compression molding composed of 42±2 wt % acrylic copolymer, 3±1 wt % soya bean oil (lecithin) and 55±1 wt % water. Then, the coated paper substrate is subjected a mirror treatment (operational procedures are described later) and lastly undergoes compression molding operations.

<Transparent Laser Hologram Paper with Laser Grains in Partial Sections>:

Procedure I:

A paper substrate is printed by an ink printing to have desired patterns and colors on a working face. The working face is entirely or partially coated with a thermal-resistant varnish or a non-thermoplastic varnish and then partially coated with a water-based varnish for compression molding. Wherein, an endurable temperature of the water-based varnish is lower than one endurable temperature of the thermal-resistant varnish. The coated paper substrate is subjected to have a mirror treatment(operational procedures are described later) and lastly undergoes compression molding operations. Therefore, when molding temperature is between the endurable temperatures of the thermal-resistant varnish and the water-based varnish, partial areas of the water-based varnish melt and can be molded to have the laser grains. On the contrary, other areas coated with the thermal-resistant varnish or the non-thermoplastic varnish can not be molded and have no laser grains so that the laser hologram paper is partially molded in the compression molding operations.

Procedure II:

A paper substrate is printed by an ink printing to have desired patterns on a working face requiring patterns, then coated with the water-based varnish on the working face entirely, and subjected to a mirror treatment. Lastly, the paper substrate is partially treated by compression molding with nickel plates having grains molded in part.

<Aluminum-Coated Laser Hologram Paper Entirely with Laser Grains>:

Procedure I

A paper substrate is coated with the water-based varnish on a working face entirely. The working face is subjected with a mirror treatment and coated with an aluminum layer by vapor depositing. After forming the aluminum layer, the working face is further coated with water-based resin and then printed by an ink printing to form a pattern layer with desired patterns on the working face. Moreover, the pattern layer is entirely coated with a water-based varnish, treated with the mirror treatment again, and molded by compression molding operations.

Procedure II

A paper substrate is entirely coated with water-based varnish on a working face, then subjected to a mirror treatment, and molded by compression molding operations. After molding, the working face is further coated with an aluminum layer by vapor depositing and then coated with water-based resin. Lastly, the paper substrate is printed by an ink printing to have desired patterns or colors on the working face.

Wherein, the paper substrate is cut into regular sheets before printing to make sheeted lithography fluent. Selectively, the paper substrate can be directly printed by rotary web printing without cutting.

<Aluminum-Coated Laser Hologram Paper Having Laser Grains in Partial Sections>:

Procedure I

A paper substrate is coated with the water-based varnish on a working face entirely, then subjected to a mirror treatment and molded by compression molding operations with nickel plates having grains molds in part. Then, the paper substrate is coated with an aluminum layer by vapor depositing and further coated with water-based resin. Lastly, the paper substrate is printed by ink printing to have desired patterns and colors on the working face.

Procedure II

A paper substrate is coated with a water-based varnish on a working face entirely, then subjected to a mirror treatment, coated with an aluminum layer by vapor depositing, and further coated with water-based resin on the aluminum layer. Then, the coated substrate is printed by ink printing to have desired patterns and colors on the working face, further partially or entirely coated with a thermal-resistant varnish or a non-thermoplastic varnish, and lastly coated with a water-based varnish. Wherein, an endurable temperature of the water-based varnish is lower than one of the thermal-resistant varnish. The coated paper substrate is subjected to have a mirror treatment and lastly undergoes compression molding operations. Therefore, when the molding temperature is between the endurable temperatures of the water-based varnish and the thermal-resistant varnish, partial areas coated with the water-based varnish are thermally molded to have laser grains. On the contrary, other areas coated with the thermal-resistant varnish or the non-thermoplastic varnish can not be melted and have no laser grains so that the laser hologram paper is partially molded in the compression molding operations.

Procedure III

A paper substrate is coated with the water-based varnish on a working face entirely, then subjected to a mirror treatment, and coated with an aluminum layer by vapor depositing. Then, the paper substrate is further coated with the water-based resin, printed by ink printing to have desired patterns and colors on the working face, entirely coated with the water-based varnish, subjected to the mirror treatment and lastly partially molded with layer compressing operations with nickel plates having grains molds in part.

Figure 4:
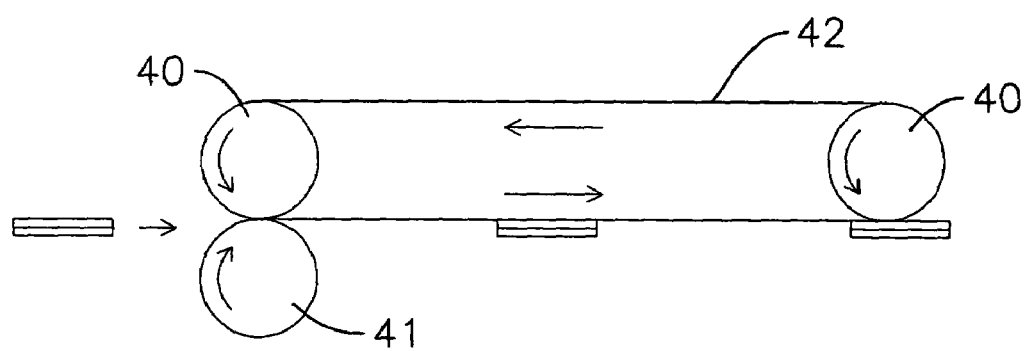
FIG. 4 is a schematic operational view showing another method for manufacturing the laser hologram paper in accordance with the present invention.

Except the operational process of the preferred embodiment in the present invention, the mirror treatment is further illustrated as the following:

In order to make the laser hologram papers have deflective efficiency, the mirror treatment is commonly used in treating of the varnish layers. As shown in FIG. 4, a system for the mirror treatment comprises two conveying wheels (40), a flexible iron belt (42) looped around the two conveying wheels (40,) and a compressing roller (41) in contact with one of the conveying wheels (40). The conveying wheel (40) abutting the compressing roller (41) is heated.

When the paper substrate is fed between the compressing roller (41) and the heated conveying wheel (40), the working face faces the iron belt (42) to make the varnish layer heated by the conveying wheel (40) and adhere to the iron belt (42). Thereby, the varnish layer possesses a mirror effect after thermal compression.

Figure 3:
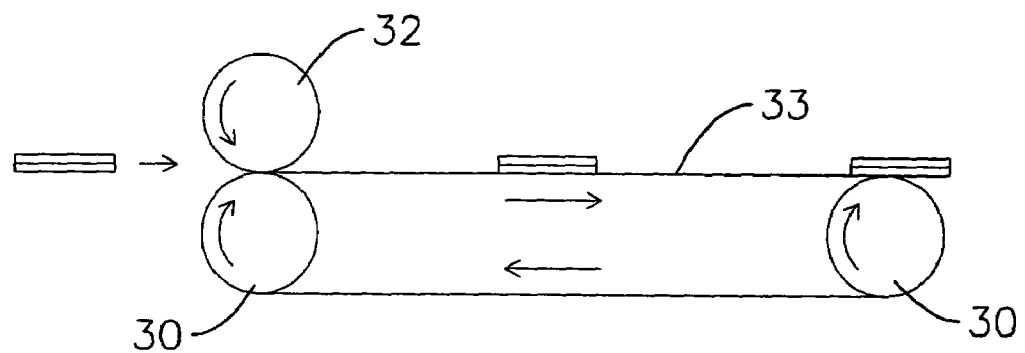
FIG. 3 is a schematic operational view showing a method for manufacturing the laser hologram paper in accordance with the present invention.

However, the paper substrate easily detaches from the iron belt (42) when the working face is not completely covered with the varnish and the paper substrate only partially contacts the iron belt (42). Therefore, the quality of the mirror effect on the laser hologram paper is reduced. To overcome the foregoing problem, another system is carried out in the present invention that is to place the paper substrate over the iron belt. As shown in FIG. 3, the system for the mirror treatment also comprises two conveying wheels (30), a flexible iron belt (33) looped around the two conveying wheels (30), and a compressing roller (32) in contact with one of the conveying wheels (30). The difference between this system and the foregoing one is that the compressing roller (32) is located over the corresponding conveying wheel (30). Therefore, the paper substrate is mounted on the iron belt (33) with its working face facing down to contact with the iron belt (33). By supporting of the iron belt (33), the paper substrate does not fall from the iron belt (33) during the mirror treatment and the paper substrate completely contacts the iron belt (33) even when the paper substrate is not completely coated with the varnish.

According to the above description, the methods and the laser hologram papers in the present invention have the following advantages:

1. Environmental Friendly:

Conventional laser hologram papers are all made of PET or PVC plastic membranes attached to a paper substrate. Therefore, the plastic membranes have to be separated from the paper substrate before the conventional laser hologram papers are recycled. Because the treating method of separating is troublesome and the recycled plastic membranes have low economic worth, the conventional laser hologram papers are directly discarded without treatment and cause environmental problems. In the present invention, the water-based resin performs the coating layers that substitute the plastic membranes. The water-based resin is environmental friendly and can be naturally decomposed after discarding.

2. Low Manufacturing Cost:

Without using the plastic membranes, material cost of the plastic membranes is saved for manufacturer.

3. Excellent and Various Appearances:

Conventional methods for manufacturing laser hologram papers have problems of mis-alignment between the laser grains on the plastic membranes and the patterns on the paper substrate. In the present invention, the varnish is directly coated on the paper substrate to perform "multiple-laminating" coating without alignment of the plastic membranes and the paper substrate. Therefore, the laser hologram paper can have more variety in appearance.

4. Counterfeit-Deterring Efficiency:

Unlike the tenacity of the plastic membranes on the conventional laser hologram papers, the varnish layers on the laser hologram paper are breakable. Therefore, the laser hologram papers will be damaged when some offenders try to peel the laser hologram papers off to attach them on fake goods.

Although the invention has been explained in relation to its preferred embodiment, it is to be understood that many other possible modifications and variations can be made without departing from the spirit and scope of the invention as hereinafter claimed.

What is claimed is:

1. A method for manufacturing an aluminum-coated laser hologram paper, the method comprising acts of:

coating a working face of a paper substrate with a first water-based varnish layer;

thermally compressing the first water-based varnish layer;

steam coating an aluminum film on the water-based varnish layer by vapor deposition;

coating a water-based resin film on the aluminum film;

printing an ink layer on the water-based resin film to form patterns;

coating a second water-based varnish layer on the ink layer;

thermally compressing the second water-based varnish layer; and compression molding the paper substrate to perform laser grains on the water-based varnish layer;

wherein the water-based varnish layer comprises 42±2 wt% acrylic copolymer, 3±1 wt% soya bean oil (lecithin) and 55±1 wt% water.

2. The method as claimed in claim 1, wherein the laser grains are formed on the water-based varnish layer in partial sections in the act of compression molding.

3. The method as claimed in claim 1, wherein the method further comprising an act of coating a thermal-resistant varnish layer before the act of coating the water-based varnish layer.

4. The method as claimed in claim 3, wherein the thermal-resistant varnish layer is coated on the paper substrate in partial sections and the water-based varnish layer is also coated on the thermal-resistant varnish layer in partial sections.

5. The method as claimed in claim 3, wherein the thermal-resistant varnish layer is coated on the paper substrate completely, and the water-based varnish layer is coated on the thermal-resistant varnish layer in partial sections.

6. The method as claimed in claim 1, wherein the method further comprising an act of coating a non-thermoplastic varnish layer before the act of coating the water-based varnish layer.

7. The method as claimed in claim 6, wherein the non-thermoplastic varnish layer is coated on the paper substrate in partial sections, and the water-based varnish layer is coated on the non-thermoplastic varnish layer in partial sections.

8. The method as claimed in claim 6, wherein the non-thermoplastic varnish layer is coated on the paper substrate completely, and the water-based varnish layer is coated on the non-thermoplastic varnish layer in partial sections.

9. A method for manufacturing an aluminum-coated laser hologram paper, the method comprising acts of:
   coating a working face of a paper substrate with a first water-based varnish layer;
   thermally compressing the first water-based varnish layer;
   steam coating an aluminum film on the water-based varnish layer by vapor deposition;
   coating a water-based resin film on the aluminum film;
   printing an ink layer on the water-based resin film to form patterns;
   coating a second water-based varnish layer on the ink layer;
   thermally compressing the second water-based varnish layer;
   compression molding the paper substrate to perform laser grains on the water-based varnish layer; and,
   coating a thermal-resistant varnish layer before the act of coating the water-based varnish layer;
   wherein the thermal-resistant varnish layer comprises 42±2 wt% acrylic copolymer and 55±2 wt% water.

10. A method for manufacturing an aluminum-coated laser hologram paper, the method comprising acts of:
   coating a working face of a paper substrate with a first water-based varnish layer;
   thermally compressing the first water-based varnish layer;
   steam coating an aluminum film on the water-based varnish layer by vapor deposition;
   coating a water-based resin film on the aluminum film;
   printing an ink layer on the water-based resin film to form patterns;
   coating a second water-based varnish layer on the ink layer;
   thermally compressing the second water-based varnish layer;
   compression molding the paper substrate to perform laser grains on the water-based varnish layer; and,
   coating a non-thermoplastic varnish layer before the act of coating the water-based varnish layer;
   wherein the non-thermoplastic varnish layer comprises 50-60 wt% acrylic monomer, 40-50 wt% epoxy acrylate oligomer and 5wt% photo-initiator.

* * * * *